United States Patent
Arai et al.

(10) Patent No.: US 8,102,411 B2
(45) Date of Patent: Jan. 24, 2012

(54) OPTICAL SCANNER AND IMAGE FORMING APPARATUS

(75) Inventors: Nobuyuki Arai, Kanagawa (JP); Tomoya Ohsugi, Kanagawa (JP); Yoshinori Hayashi, Kanagawa (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 984 days.

(21) Appl. No.: 12/028,346

(22) Filed: Feb. 8, 2008

(65) Prior Publication Data

US 2008/0219601 A1    Sep. 11, 2008

(30) Foreign Application Priority Data

Mar. 7, 2007   (JP) .................................. 2007-057656

(51) Int. Cl.
*B41J 15/14*    (2006.01)
*B41J 27/00*    (2006.01)

(52) U.S. Cl. ........................................ 347/243; 347/257

(58) Field of Classification Search .................. 347/230, 347/238, 241–245, 256–261, 263
See application file for complete search history.

(56) References Cited

U.S. PATENT DOCUMENTS

| | | |
|---|---|---|
| 6,462,853 B2 | 10/2002 | Hayashi |
| 6,587,245 B2 | 7/2003 | Hayashi |
| 6,657,765 B2 | 12/2003 | Hayashi et al. |
| 6,686,946 B2 | 2/2004 | Masuda et al. |
| 6,757,089 B2 | 6/2004 | Hayashi |
| 6,768,506 B2 | 7/2004 | Hayashi et al. |
| 6,771,296 B2 | 8/2004 | Hayashi et al. |
| 6,771,407 B2 | 8/2004 | Hayashi et al. |
| 6,788,444 B2 | 9/2004 | Suzuki et al. |
| 6,803,941 B2 | 10/2004 | Hayashi et al. |
| 6,839,157 B2 | 1/2005 | Ono et al. |
| 6,903,856 B2 | 6/2005 | Hayashi |
| 6,906,739 B2 | 6/2005 | Suzuki et al. |
| 6,934,061 B2 | 8/2005 | Ono et al. |
| 6,956,685 B2 | 10/2005 | Hayashi |
| 6,987,593 B2 | 1/2006 | Hayashi et al. |
| 7,006,120 B2 | 2/2006 | Sakai et al. |
| 7,050,210 B2 | 5/2006 | Atsuumi et al. |

(Continued)

FOREIGN PATENT DOCUMENTS

JP   59060418 A   *   4/1984

(Continued)

OTHER PUBLICATIONS

Office Action issued May 31, 2011, in Japanese Patent Application No. 2007-057656.

*Primary Examiner* — Hai C Pham
(74) *Attorney, Agent, or Firm* — Oblon, Spivak, McClelland, Maier & Neustadt, L.L.P.

(57) ABSTRACT

An optical scanner includes a housing and an intermediate member that includes a first joining surface and a second joining surface. The first joining surface is attached to the housing and the second joining surface is attached to at least one optical element of any one of a first optical system and a second optical system. In a three-dimensional coordinate in which a first one of coordinate axes is a direction that is parallel to both the first joining surface and the second joining surface, a second range on the first coordinate axis corresponding to the second joining surface includes a center point of a first range on the first coordinate axis corresponding to the first joining surface.

14 Claims, 11 Drawing Sheets

U.S. PATENT DOCUMENTS

| | | |
|---|---|---|
| 7,068,296 B2 | 6/2006 | Hayashi et al. |
| 7,088,484 B2 | 8/2006 | Hayashi et al. |
| 7,106,483 B2 | 9/2006 | Hayashi et al. |
| 7,145,705 B2 | 12/2006 | Hayashi |
| 7,218,432 B2 | 5/2007 | Ichii et al. |
| 7,236,281 B2 | 6/2007 | Hayashi et al. |
| 7,253,937 B2 | 8/2007 | Ueda et al. |
| 7,271,823 B2 | 9/2007 | Izumi et al. |
| 7,271,824 B2 | 9/2007 | Omori et al. |
| 7,295,225 B2 | 11/2007 | Ohsugi |
| 7,468,823 B2 * | 12/2008 | Yamaguchi ................ 359/205.1 |
| 7,817,177 B2 * | 10/2010 | Hayashi et al. .............. 347/242 |
| 2003/0053156 A1 | 3/2003 | Satoh et al. |
| 2004/0036936 A1 | 2/2004 | Nakajima et al. |
| 2004/0125193 A1 | 7/2004 | Kubo |
| 2004/0184127 A1 | 9/2004 | Nakajima et al. |
| 2005/0243396 A1 | 11/2005 | Fujii et al. |
| 2006/0077500 A1 | 4/2006 | Hayashi et al. |
| 2006/0152788 A1 * | 7/2006 | Kaneko ......................... 359/218 |
| 2006/0187513 A1 | 8/2006 | Ohsugi |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0058255 A1 | 3/2007 | Imai et al. |
| 2007/0211324 A1 | 9/2007 | Sakai et al. |
| 2007/0216966 A1 | 9/2007 | Ohsugi |
| 2007/0253048 A1 | 11/2007 | Sakai et al. |
| 2007/0297036 A1 | 12/2007 | Nakamura et al. |

FOREIGN PATENT DOCUMENTS

| | | |
|---|---|---|
| JP | 07064006 A * | 3/1995 |
| JP | 09-243947 | 9/1997 |
| JP | 2004074627 A * | 3/2004 |
| JP | 2004287294 A * | 10/2004 |
| JP | 2006-284822 | 10/2006 |
| JP | 2007-025165 | 2/2007 |
| JP | 2007-171626 | 7/2007 |

* cited by examiner

FIG. 13

| | YOUNG'S MODULUS (Pa) | POISSON'S RATIO | DENSITY (Kg/m²) | LINEAR EXPANSION COEFFICIENT (/°C) | SPECIFIC HEAT (J/Kg·°C) | THERMAL CONDUCTIVITY (W/m·°C) |
|---|---|---|---|---|---|---|
| ALUMINIUM ALLOY (A5083) | $7.0 \times 10^{10}$ | 0.33 | 2660 | $2.3 \times 10^{-5}$ | 960 | 120 |
| SILICA GLASS | $7.3 \times 10^{10}$ | 0.17 | 2220 | $5.0 \times 10^{-7}$ | 700 | 1.4 |
| POLYCARBONATE (PC) | $2.2 \times 10^{9}$ | 0.39 | 1200 | $7.0 \times 10^{-5}$ | 1050 | 0.16 |

LINEAR EXPANSION COEFFICIENT DENOTES VALUE AT 20°C

OPTICAL SCANNER AND IMAGE FORMING APPARATUS

CROSS-REFERENCE TO RELATED APPLICATIONS

The present application claims priority to and incorporates by reference the entire contents of Japanese priority document 2007-057656 filed in Japan on Mar. 7, 2007.

BACKGROUND OF THE INVENTION

1. Field of the Invention

The present invention relates to an optical scanner that forms a latent image on an image carrier, an image forming apparatus including the same.

2. Description of the Related Art

In a currently used optical scanner and an image forming apparatus including the optical scanner, formation of a full color image, enhanced image quality, enhanced speed, and a low cost are increasingly called for. In the commonly used optical scanner, for meeting a demand of enhanced image quality, bending of scanning lines needs to be reduced, a fluctuation of a beam spot diameter on an image surface needs to be reduced, constant speed characteristics need to be enhanced, and a displacement of a beam spot needs to be reduced.

To increase the speed, multi-beam scanners that can simultaneously scan a plurality of the scanning lines has provided recently. However, in a currently used method, because a luminous point, which is a light source, is positioned at a distance from an optical axis in a sub-scanning direction, bent shapes of the scanning lines differ. An image forming apparatus such as a tandem image forming apparatus uses a full color compatible method in which different scanning optical systems scan scanned surfaces corresponding to a plurality of colors and resulting images are overlapped to form a full color image. Thus, due to the differing bent shapes of the scanning lines, using the multi beam method in the tandem image forming apparatus causes occurrence of color shift in the sub-scanning direction and the image quality is reduced.

Furthermore, if an interval differs for each image height due to bending of the scanning lines, a difference of gray-scales occurs in the image and the image quality deteriorates.

The image forming apparatus that produces a suitable image under a normal environment may print out a color-shifted image because of a change in the room temperature or a rise in the temperature inside the image forming apparatus due to continuous printing. This is because such a temperature change causes a minute change in an optical element inside the image forming apparatus and causes a fluctuation in an optical path. A beam interval in the sub-scanning direction fluctuates and appears as color shift in the output image.

The drawback of color shift due to environmental fluctuations mentioned earlier is required to be overcome in the image forming apparatus, especially in the color image forming apparatus that attempts to further enhance a high density and a high quality of the image.

For realizing a lower cost while enhancing high image quality and high speed of the image forming apparatus, in the optical scanner that is disclosed in Japanese Patent Application Laid-open No. 2006-284822, the number of high-cost light sources is reduced to half and beam splitting elements are used that enable a high speed image output.

In a multi-beam light source, adjustment and accuracy of a beam spot position interval in the sub-scanning direction, in other words, adjustment and accuracy of a sub-scanning beam pitch is an important technology for obtaining a high quality image.

In a commonly used method, the light source is rotated around an axis that is orthogonal to the main-scanning direction and the sub-scanning direction to obtain the desired sub-scanning beam pitch. However, in a beam splitting method, because two photosensitive elements are exposed with lights emitted from a single light source, although the desired sub-scanning beam pitch can be obtained for one of the photosensitive elements, a pitch error occurs in the other photosensitive element due to a shape error or a fixing error of the optical elements other than the beam splitting elements.

To overcome the problem, a cylindrical-lens supporting method, which uses an intermediate member, is disclosed in Japanese Patent Application Laid-open No. 2006-284822.

There are two ways of supporting the cylindrical lens. One is called one-side supporting method and the other is called both-side supporting method. In the one-side supporting method, although an adjustment of the beam spot position interval in multiple directions is enabled, a shape of the intermediate member may change due to environmental fluctuations such as changes in temperature and humidity. If the shape of the intermediate member changes, the cylindrical lens is tilted and the beam spot position fluctuates, thus causing color shift in the output image.

Further, if the cylindrical lens is tilted, a wave aberration deteriorates, the beam spot diameter increases, and the image quality deteriorates.

In the both-side supporting method, although tilting of the cylindrical lens is less compared to the one-side supporting method, a degree of freedom in layout of the optical scanner decreases and the number of components increases. Thus, the both-side supporting method is inappropriate for producing a low-cost image forming apparatus.

SUMMARY OF THE INVENTION

It is an object of the present invention to at least partially solve the problems in the conventional technology.

According to an aspect of the present invention, there is provided an optical scanner. The optical scanner includes a light source that emits a light beam; a first optical system that guides the light beam; a deflecting unit that receives the light beam from the first optical system and produces a deflected light beam by deflecting the light beam; a second optical system that guides the deflected light beam onto a surface to be scanned; a housing that supports the light source and the deflecting unit; and an intermediate member that includes a first joining surface and a second joining surface. The first joining surface is attached to the housing and the second joining surface is attached to at least one optical element of any one of the first optical system and the second optical system. In a three-dimensional coordinate in which a first one of coordinate axes is a direction that is parallel to both the first joining surface and the second joining surface, a second range on the first coordinate axis corresponding to the second joining surface includes a center point of a first range on the first coordinate axis corresponding to the first joining surface.

According to another aspect of the present invention, there is provided an image forming apparatus. The image forming apparatus includes the above optical scanner.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a physical-property table of the cylindrical lens, the intermediate member, and the housing that are used in the present embodiment;

DETAILED DESCRIPTION OF THE PREFERRED EMBODIMENTS

Exemplary embodiments of the present invention are explained below with reference to the accompanying drawings.

Figure 1:
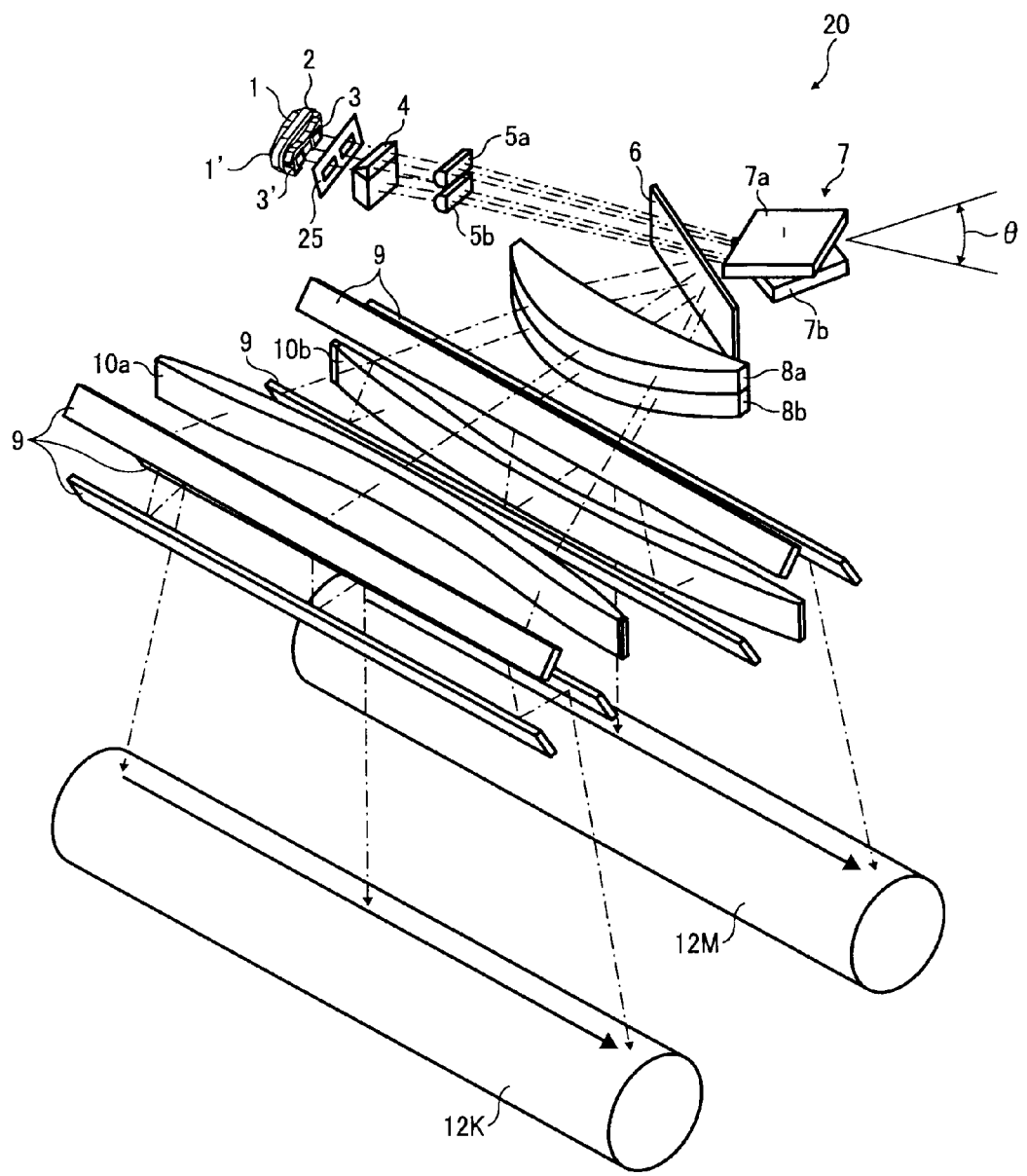
FIG. 1 is a perspective view for explaining the structure of relevant parts of an optical scanner according to an embodiment of the present invention.

FIG. 1 is a perspective view for explaining the structure of relevant parts of an optical scanner 20 according to an embodiment of the present invention. The optical scanner 20 includes semiconductor lasers 1 and 1' as light sources, a laser diode (LD) (semiconductor laser) base 2, coupling lenses 3 and 3', a half-mirror prism 4 as a beam splitting unit, cylindrical lenses 5 and 5', a soundproof glass 6, a deflecting unit that is made from polygon mirrors, a first scanning lens 8, a mirror 9, a second scanning lens 10, photosensitive element 12M and 12K as scanned surfaces (image carriers), and an aperture stop 25.

The coupling lenses 3 and 3', the half-mirror prism 4, and the cylindrical lens 5 form a first optical system. The first scanning lens 8, the mirror 9, and the second scanning lens 10 form a second optical system. Thus, the cylindrical lens 5 is an "optical element included in the first optical system".

The structure corresponding to two photosensitive elements is shown in FIG. 1. There is another set of optical systems (not shown) that are similar to the optical systems shown in FIG. 1 arranged across the deflecting unit 7, and therefore the optical scanner 20 can scan four photosensitive elements.

The coupling lenses 3, 3' convert each of two divergent beams which are emitted from the semiconductor lasers 1 and 1' into weak convergent beams, parallel beams, or weak divergent beams.

The beams which exit the coupling lenses 3 and 3' pass via the aperture stop 25 that is arranged for stabilizing a beam diameter on the scanned surfaces and are incident into the half-mirror prism 4. The beams from a common light source, which are incident into the half-mirror prism 4, are split into upper and lower beams. Thus, a total of four beams exit the half-mirror prism 4.

Figure 2:
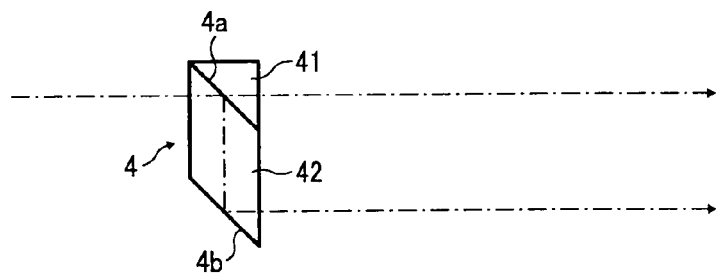
FIG. 2 is a schematic diagram of a half-mirror prism shown in FIG. 1.

FIG. 2 is a schematic diagram for explaining a beam splitting method using the half-mirror prism 4. A cross section of the half-mirror prism 4 parallel to the sub-scanning direction is shown.

The half-mirror prism 4 functions as a beam splitting unit. A cross sectional surface of the half-mirror prism 4 includes a triangular portion 41 and a parallelogram portion 42. A joining surface 4a of the portions 41 and 42 is a half mirror that separates transmitted light and reflected light in a ratio of 1:1. A surface 4b, which is positioned opposite the joining surface 4a of the parallelogram portion 42, is a total reflecting surface and includes a function to convert directions. Although the half-mirror prism 4 is used as the beam splitting unit in the present embodiment, a simple half mirror and a normal mirror can also be used to form a similar system. Further, the ratio of separation of the half mirror need not be 1:1, and can also be set according to conditions of other optical systems.

The beams which exit the half-mirror prism 4 are converted into linear images elongated in the main-scanning direction near a deflecting/reflecting surface by the cylindrical lenses 5 and 5'. The cylindrical lens 5 is arranged upper than the cylindrical lens 5'. The deflecting unit 7 includes simple polygon mirrors 7a and 7b. The polygon mirror 7a and 7b are overlapped with each other in such a manner the rotation axes thereof overlap but the polygon mirror 7a and 7b are displaced in the rotation direction (in the present embodiment, θ=45 degrees). The polygon mirror 7a is positioned upside of the polygon mirror 7b.

Both the polygon mirrors 7a and 7b are of the same shape and can be any type of polygons. The polygons overlap such that an apex of one polygon corresponds to an angle that nearly bisects a central angle on one side of the other polygon.

Figure 3A:
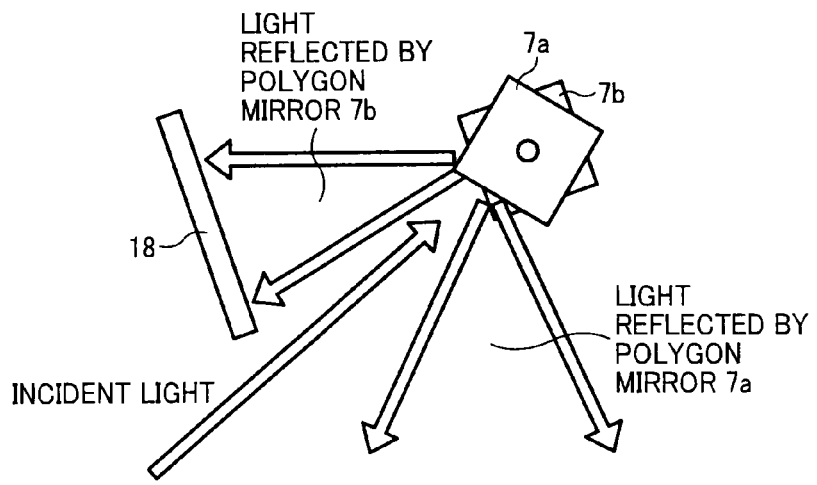
FIGS. 3A and 3B are schematic diagrams for explaining scanning operation using a two-tiered polygon mirror.
Figure 3B:
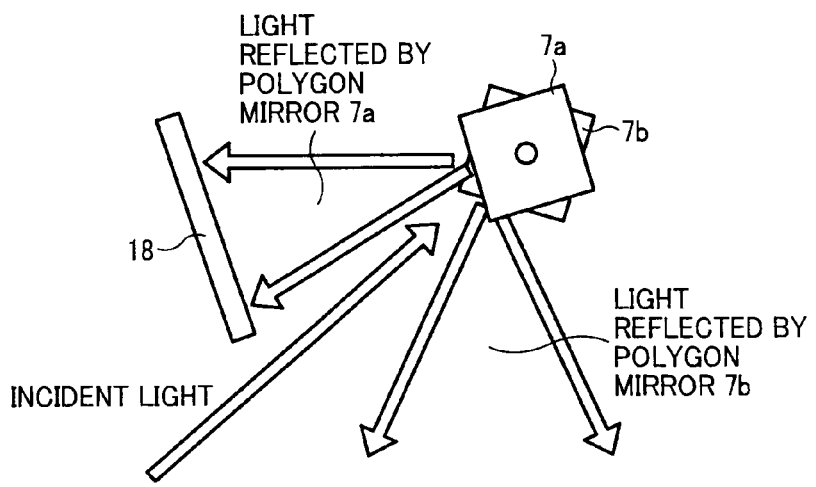

FIGS. 3A and 3B are schematic diagrams for explaining scanning operation by the polygon mirrors 7a and 7b. A shielding member 18 shields a target surface from a light beam reflected by either the polygon mirror 7a or 7b. When the upper beam is scanning the photosensitive element 12K that is the scanned surface, the lower beam does not reach the surface to be scanned (photosensitive element 12M) and the lower beam is desirably shielded by the shielding member 18.

Further, when the lower beam is scanning the photosensitive element 12M that differs from the photosensitive element 12K, the upper beam does not reach the photosensitive element 12K. Timings of the upper beam and the lower beam are also displaced when carrying out modulated driving. When scanning the photosensitive element 12K corresponding to the upper beam, modulated driving of the light source is carried out based on image data of a color (for example, black) corresponding to the upper beam. When scanning the photosensitive element 12M corresponding to the lower beam, modulated driving of the light source is carried out based on image data of another color (for example, magenta) corresponding to the lower beam.

Figure 4:
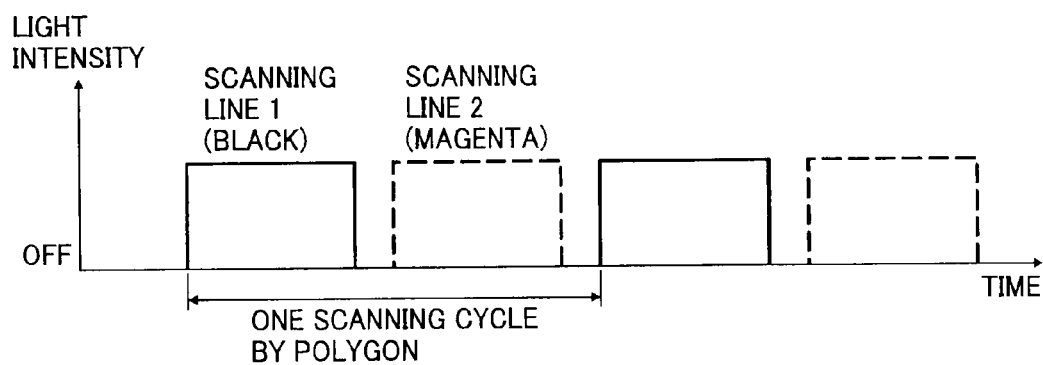
FIG. 4 is a timing chart for explaining exposure timing for a plurality of colors.

FIG. 4 is a timing chart for explaining exposure timing for a plurality of colors. The vertical axis represents a light intensity and the horizontal axis represents time. In the timing chart shown in FIG. 4, black and magenta colors are exposed to light using the common light source and the respective colors are completely lighted in an effective scanning area.

As shown in FIG. 4, a continuous line indicates a portion corresponding to black color and a dotted line indicates a portion corresponding to magenta color. A synchronous light receiver, which is arranged outside an effective scanning width, detects scanning beams to decide write timings for black and magenta colors. Although the synchronous light receiver is not shown in FIG. 4, normally a photo diode is used.

Figure 5:
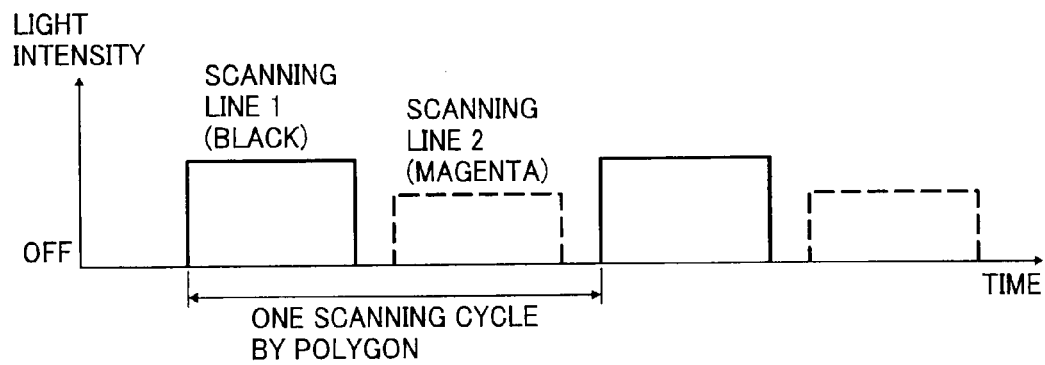
FIG. 5 is a timing chart in which light intensities vary for different colors.

FIG. 5 is a timing chart in which light intensities vary for different colors.

In the example shown in FIG. 4, the light intensities on the black area and the magenta area are the same level. However, in reality, a transmissivity and a reflectivity of an optical element relatively differ. Due to this, if the same light intensity is set in the light source, the light intensities of the beams that reach the photosensitive elements differ. To overcome the drawback, as shown in FIG. 5, when scanning the different photosensitive element surfaces, the set light intensities are caused to mutually differ. Due to this, the light intensities of the beams, which reach the different photosensitive element surfaces, can be equalized.

The multiple beams, which exit from the semiconductor lasers 1, 1' shown in FIG. 1, form two scanning lines on the two different photosensitive elements during one time scanning. A pitch of the scanning lines in the sub-scanning direction needs to be adjusted according to a pixel density.

In a method that is widely used as a pitch adjusting method, the light source unit (the semiconductor lasers 1, 1', the LD base 2, and the coupling lenses 3, 3' are treated as a single unit) is rotated around an axis that is orthogonal to both the main-scanning direction and the sub-scanning direction. When using the method mentioned earlier, although the desired pitch can be obtained for one of the photosensitive elements, a pitch error occurs in the other photosensitive element due to a shape error or a fixing error of the beam splitting elements or the optical elements downward of the beam splitting elements.

To overcome the drawback, a unit, which adjusts the pitch in the sub-scanning direction, needs to be arranged between the beam splitting elements and the deflecting unit.

Figure 16:
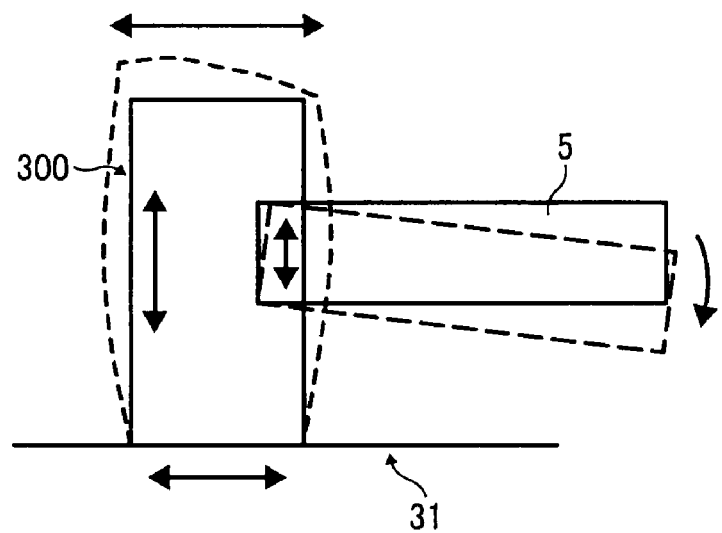
FIG. 16 is a schematic diagram for explaining deformation of a conventional intermediate member that supports the cylindrical lens due to a temperature change.

The one-side supporting method for supporting the cylindrical lens by the intermediate member according to Japanese Patent Application Laid-open No. 2006-284822 is shown in FIG. 16. Two-sided arrows shown in FIG. 16 indicate a conceptual deformation amount due to thermal expansion.

In the conventional method (a technology compared to the present invention), an intermediate member 300 thermally expands due to a usage environment temperature or due to a temperature change resulting from heating of a polygon scanner during continuous printing. Thus, as shown in FIG. 17, a tilt occurs in the cylindrical lens 5 due to a difference between linear expansion coefficients of a joining surface and the intermediate member 300 and a difference between the linear expansion coefficients of a housing 31 and the intermediate member 300.

Figure 6:
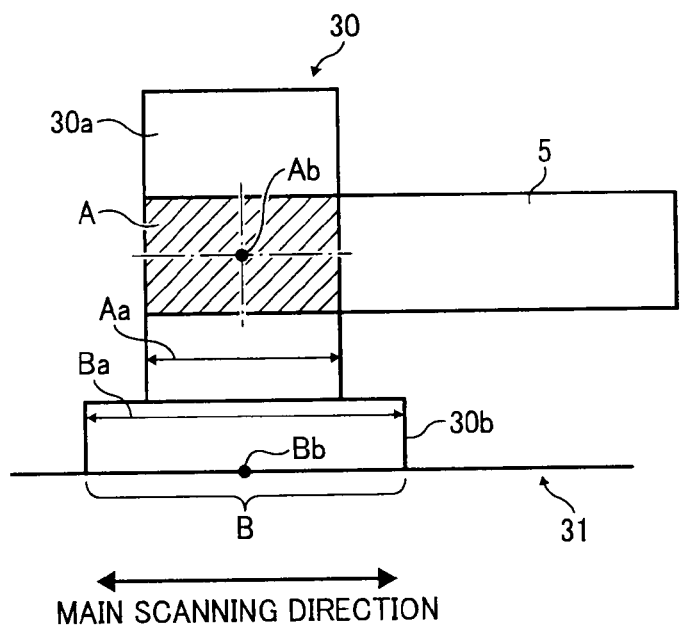
FIG. 6 is a schematic diagram of a cylindrical lens and an intermediate member that are fixed to each other.

FIG. 6 is a schematic diagram of a cylindrical-lens supporting method according to the embodiment using an intermediate member 30.

Figure 17:
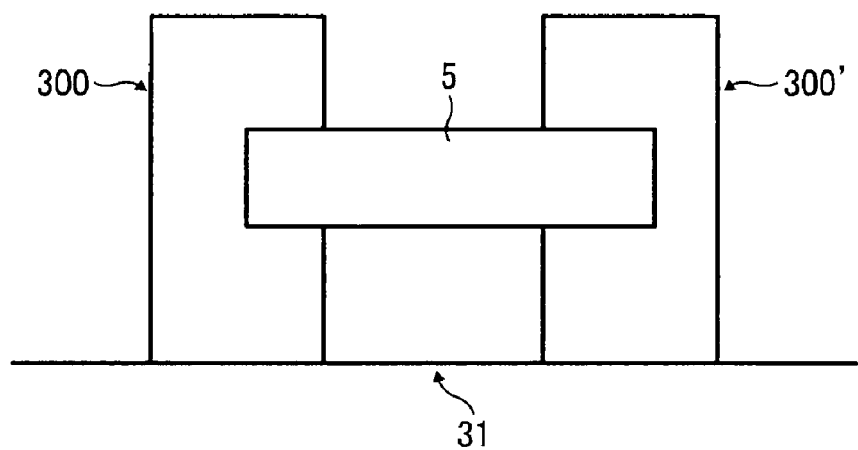
FIG. 17 is a schematic diagram of a both-side supporting method with the intermediate member.

From viewpoints of a freedom of layout and a low cost, the one-side supporting method is desirable compared to the both-side supporting method shown in FIG. 17 that supports both sides of the cylindrical lens 5.

When supporting the cylindrical lens 5 on one side, as shown in FIG. 6, the shape of the intermediate member 30 is such that a lower portion 30b (hereinafter, "base portion") of the intermediate member 30 is wider than an upper portion 30a (hereinafter, "supporting portion") for ensuring stability of the intermediate member 30 with respect to the housing 31.

One side of the cylindrical lens 5 is fixedly joined to the supporting portion 30a of the intermediate member 30 via a surface A that is a joining surface. The base portion 30b of the intermediate member 30 is fixedly joined to a bottom surface of the housing 31 via a surface B that is a joining surface.

In a three-dimensional coordinate in which a first one of coordinate axes is a direction (i.e., main-scanning direction) that is parallel to both the surface A and the surface B, a range Aa on the first coordinate axis corresponding to the surface A includes a center point Bb of a range Ba on the first coordinate axis corresponding to the surface B.

A shape of the surface A (more precisely, a joining surface of the cylindrical lens 5 that is attached to the surface A) is substantially symmetric with respect to a line that is parallel to the main-scanning direction and on which a center point Ab of the surface A falls and a line that is parallel to the sub-scanning direction and on which the center point Ab falls.

The range Ba corresponding to the surface B is larger than the range Aa corresponding to the surface A (Ba>Aa).

The range Aa is positioned near a center area of the range Ba.

A shape of the intermediate member 30 is substantially symmetrical with respect to a plane (sub-scanning direction) orthogonal to the surface A and the surface B and on which the center point of the surface B falls.

Figure 7:
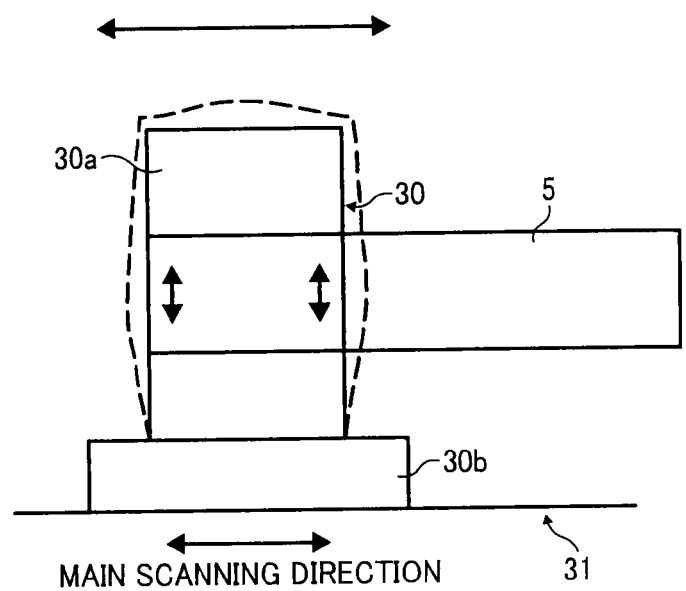
FIG. 7 is a schematic diagram for explaining deformation of the intermediate member that supports the cylindrical lens due to a temperature change.

FIG. 7 is a schematic diagram for explaining a concept of a deformation due to thermal expansion on the intermediate member 30 having the structure shown in FIG. 6. Two-sided arrows shown in FIG. 7 indicate the conceptual deformation amount due to thermal expansion.

The joining surface A of the intermediate member 30 and the cylindrical lens 5 is arranged across the entire width of the supporting portion 30a of the intermediate member 30 in the main-scanning direction. Due to this, the linear expansion coefficients on the left side and on the right side of the central axis of the intermediate member 30 in the main-scanning direction become equal and elongations, due to temperature fluctuation, on the balance between the left side and the right side do not change. Thus, the tilt of the cylindrical lens 5 can be reduced.

Further, a width of the surface A in the main-scanning direction is less than a width of the surface B in the main-scanning direction. Due to this, the intermediate member 30 also becomes stable with respect to the housing 31, thus stabilizing the cylindrical lens 5.

In other words, as shown in FIG. 7, arranging the joining surface A of the intermediate member 30 and the cylindrical lens 5 across the entire width of the supporting portion 30a of the intermediate member 30 in the main-scanning direction enables to minimize the tilt of the cylindrical lens 5 that is caused by a deformation of the intermediate member 30 due to temperature fluctuation inside the optical scanner 20.

Thus, a sub-scanning beam pitch fluctuation, which occurs due to temperature fluctuation of the optical scanner, can be curbed and color shift can be reduced.

The cylindrical lens 5 is joined to the housing 31 via the intermediate member 30. An ultraviolet curable adhesive agent is coated on the respective joining surfaces. A position of the intermediate member 30 is adjustable with respect to the housing 31 to decenter the cylindrical lens 5 around the axis parallel to the sub-scanning direction or to adjust the cylindrical lens 5 in the optical-axis direction. A position of the cylindrical lens 5 is adjustable with respect to the intermediate member 30 to be decentered around the axis parallel to the optical axis or to be adjusted in the sub-scanning direction. At least one of the adjustable directions of the intermediate member 30 with respect to the housing 31 is different from at least one of the adjustable directions of the cylindrical lens 5 with respect to the intermediate member 30.

Using the structure mentioned earlier, it is possible to simultaneously secure a plurality of optical characteristics (a beam waist diameter, a beam waist displacement reduction, and a beam spot displacement reduction). Further, by enabling a decentering adjustment of the cylindrical lens 5 around the axis parallel to the optical axis, a scanning line interval (the sub-scanning beam pitch) in the sub-scanning direction can be optimally set.

After completion of the adjustments, the adhesive agent is hardened by ultraviolet ray emission and mutual positions are fixed.

Figure 8:
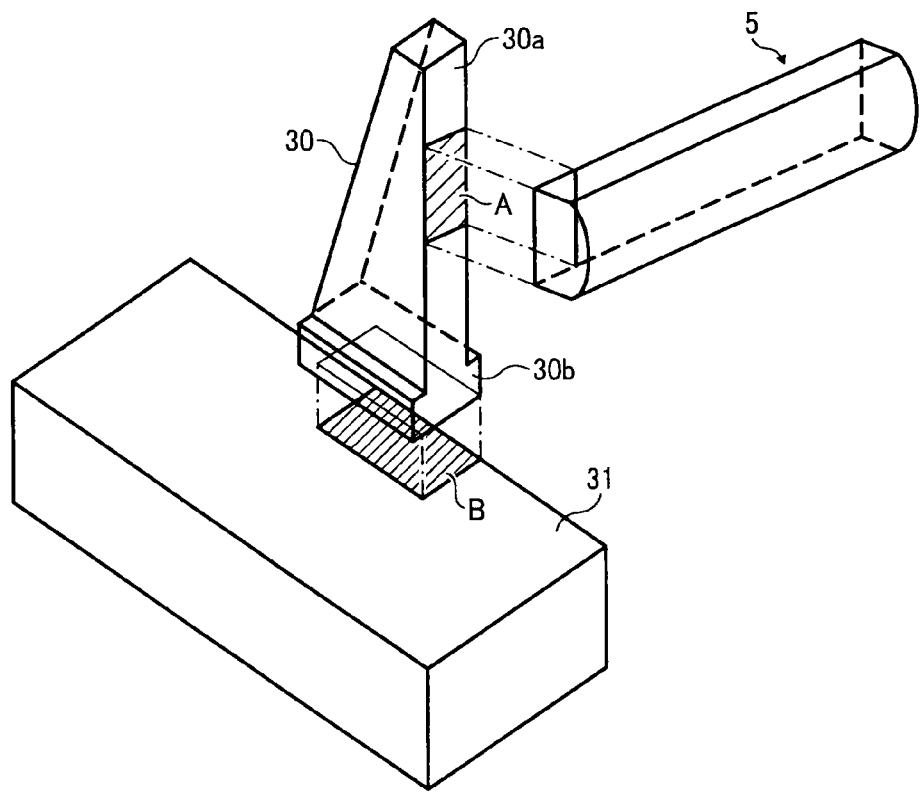
FIG. 8 is an exploded perspective view for explaining an actual adjusting method.

FIG. 8 is an exploded perspective view for explaining an actual adjusting method.

The cylindrical lens 5 is held by a jig (not shown) and is moved in a direction to be adjusted (a position of the optical axis direction, decentering around the axis parallel to the optical axis, a position of the sub-scanning direction etc.). Next, the intermediate member 30 which is coated with the ultraviolet curable adhesive agent is pressed against the cylindrical lens 5 and the housing 31, and ultraviolet rays are emitted to fix the cylindrical lens 5.

It is possible to easily adjust multiple directions using a simple structure. The transparent intermediate member 30 facilitates fixing with the ultraviolet curable adhesive agent.

Figure 9:
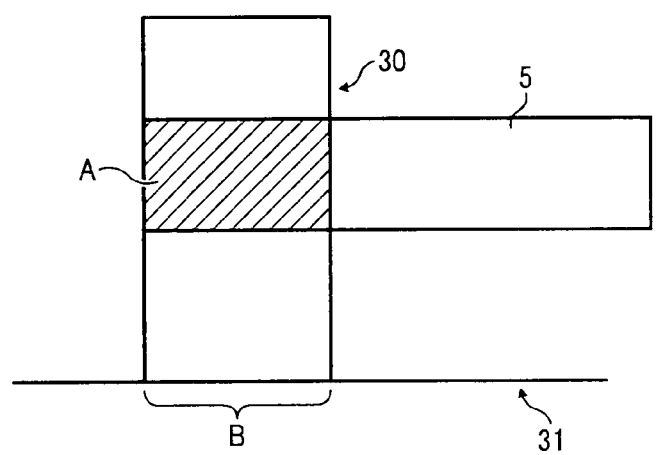
FIG. 9 is a schematic diagram of a modification of the intermediate member shown in FIG. 6.
Figure 10:
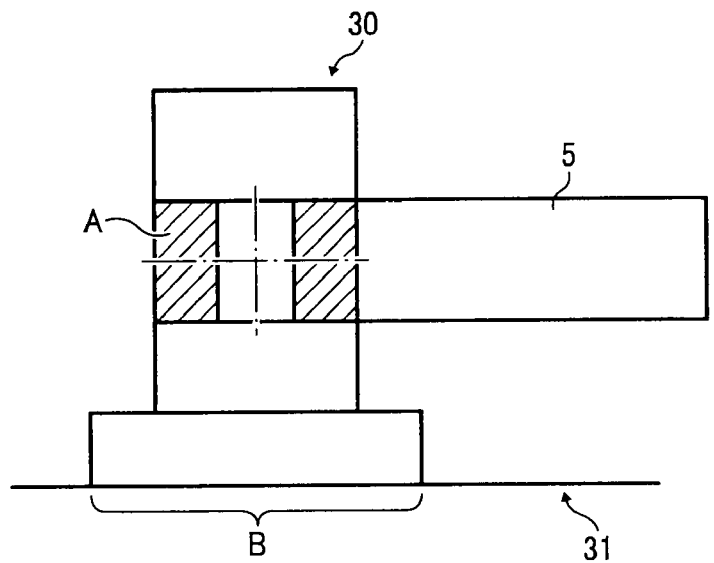
FIG. 10 is a schematic diagram of a modification of a joining surface of the cylindrical lens with respect to the intermediate member.
Figure 11:
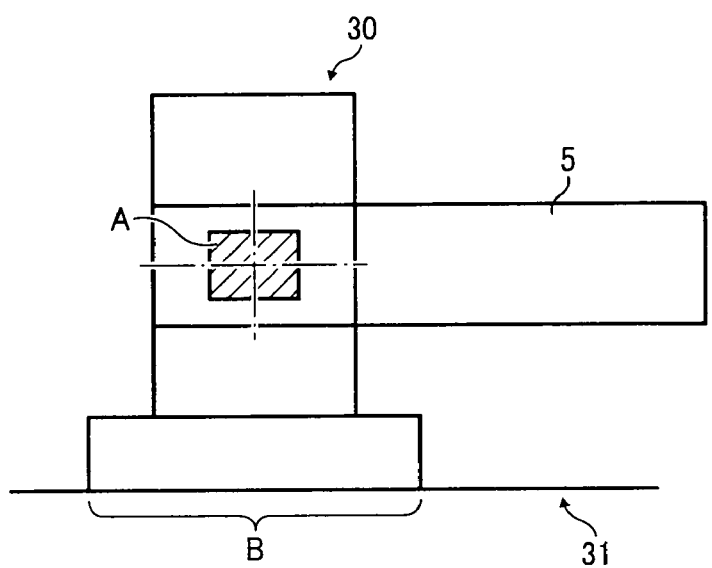
FIG. 11 is a schematic diagram of another modification of the joining surface of the cylindrical lens with respect to the intermediate member.

The shape of the intermediate member 30 is not to be limited to the example mentioned earlier. As shown in FIG. 9, for example, the shape of the intermediate member 30 can also be such that the ranges of the surface A and the surface B are equal. The joining surface A can be any shape as long as the joining surface A is substantially symmetric with respect to the center point thereof. Shapes that do not cover all overlapping area can be taken. For example, the joining surface A can be a shape as shown in FIG. 10 in which a center area thereof is excluded or a shape as shown in FIG. 11 in which a marginal area thereof is excluded.

Figure 12A:
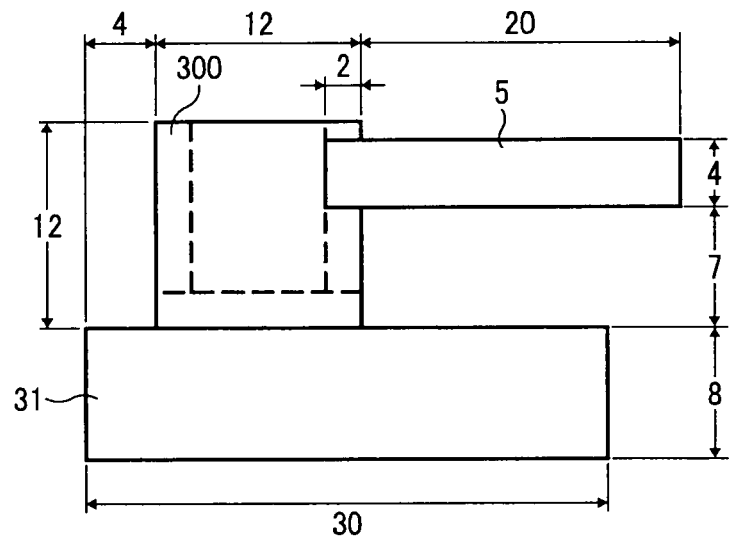
FIGS. 12A and 12B are exemplary design diagrams of the structure using a conventional supporting method with the intermediate member.
Figure 12B:
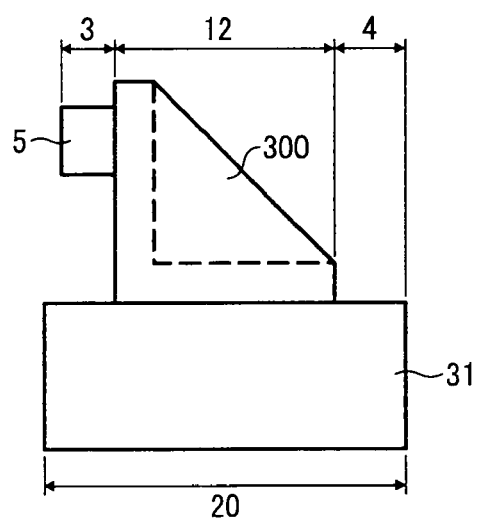

FIGS. 12A and 12B are exemplary design diagrams of the cylindrical lens 5, the intermediate member 300, and the housing 31 according to Japanese Patent Application Laid-open No. 2006-284822 by using the cylindrical-lens supporting method with the intermediate member. Dimensions (in millimeters) of the cylindrical lens 5, the intermediate member 300, and the housing 31 are shown in FIGS. 12A and 12B. A silica glass is used as a material for the cylindrical lens 5, a polycarbonate is used as the material for the intermediate member 300, and aluminum is used as the material for the housing 31.

However, the dimensions and the materials mentioned earlier are mere examples, and the dimensions and the materials are not to be thus limited when carrying out the embodiment. FIG. 13 is a physical-property table of the respective materials.

When a simulation is carried out at 25° C. to join the cylindrical lens 5 to the intermediate member 30 at zero tilt in a sub-scanning section and the temperature is raised to 45° C., a tilt of 0.036° is observed. The tilt significantly affects the output image as the sub-scanning beam pitch fluctuation by causing color drift.

Figure 14A:
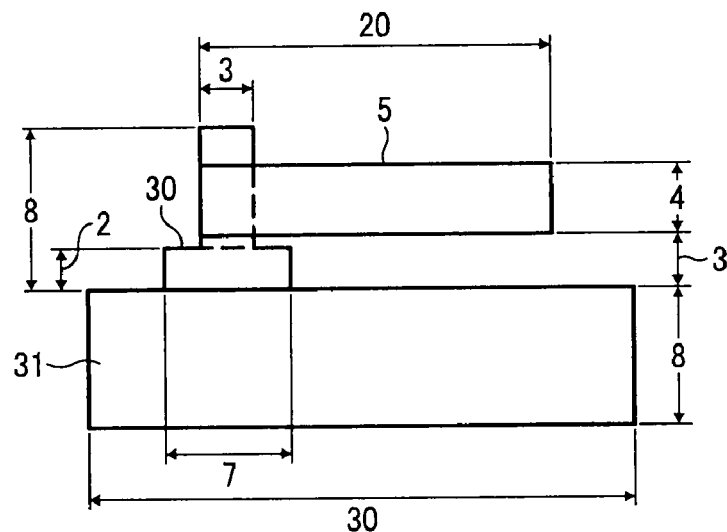
FIGS. 14A and 14B are exemplary design diagrams of the structure using the supporting method with the intermediate member according to the present embodiment.
Figure 14B:
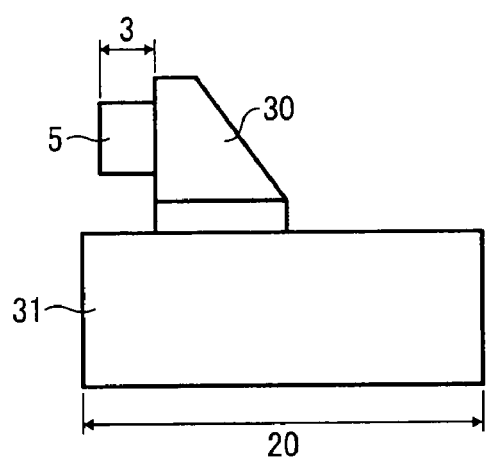

FIGS. 14A and 14B are exemplary design diagrams of the cylindrical lens 5, the intermediate member 30, and the housing 31 according to the present embodiment by using the cylindrical-lens supporting method with the intermediate member. Dimensions of the cylindrical lens 5, the intermediate member 30, and the housing 31 are shown in FIGS. 14A and 14B. The same materials as the respective materials mentioned earlier are used for the cylindrical lens 5, the intermediate member 30, and the housing 31.

When the simulation is carried out at 25° C. to join the cylindrical lens 5 to the intermediate member 30 at zero tilt in the sub-scanning section and the temperature is raised to 45° C., the tilt is curbed to 0.00006°.

Based on the simulations mentioned earlier, in the cylindrical-lens supporting method with the intermediate member according to the present embodiment, the tilt of the cylindrical lens 5 due to a temperature fluctuation from 25° C. to 45° C. is reduced by one six hundredth compared to the cylindrical-lens supporting method with the intermediate member disclosed in Japanese Patent Application Laid-open No. 2006-284822. Thus, the cylindrical-lens supporting method with the intermediate member according to the present embodiment is proved to be effective.

Normally, a semiconductor laser, which is used in the image forming apparatus, is subjected to auto power control (hereinafter, "APC") of the light intensity to ensure a stable optical output. The APC is a method in which the optical output of the semiconductor laser is monitored by light receiving elements and a forward electric current of the semiconductor laser is controlled to a desired value by using detecting signals of a light-receiving electric current that is proportional to the optical output of the semiconductor laser.

If the semiconductor laser is an edge-emitting laser diode, generally a photo diode is used in which the light receiving elements monitor the light that exits in a direction that is opposite an exit direction towards the coupling lenses. However, if unnecessary ghost light is incident when using the APC, the light intensity that is detected by the light receiving elements increases.

For example, when an incidence angle of the beam towards a reflecting mirror of the upper polygon mirror is zero degrees, that is, a reflecting surface of the reflecting mirror is exactly opposite a light source direction, if the APC is carried out in such a position, the beam that is reflected by the upper polygon mirror returns to the light source and the light intensity detected by the light receiving elements increases. Thus, an intensity of a writing laser output from the reflecting mirror of the lower polygon mirror becomes less than an intended intensity. This causes a reduction in an image density or unevenness in the image density. When the incidence angle of the beam towards the reflecting mirror of the lower polygon mirror becomes zero degrees, a similar drawback occurs in the laser output from the reflecting mirror of the upper polygon mirror.

To overcome the drawback, a setting is carried out to ensure that the APC is not carried out when the incidence angle is zero degrees for any one of the reflecting mirrors.

Thus, using the structure mentioned earlier enables to get the image output of appropriate density and less unevenness in the image density.

Figure 15:
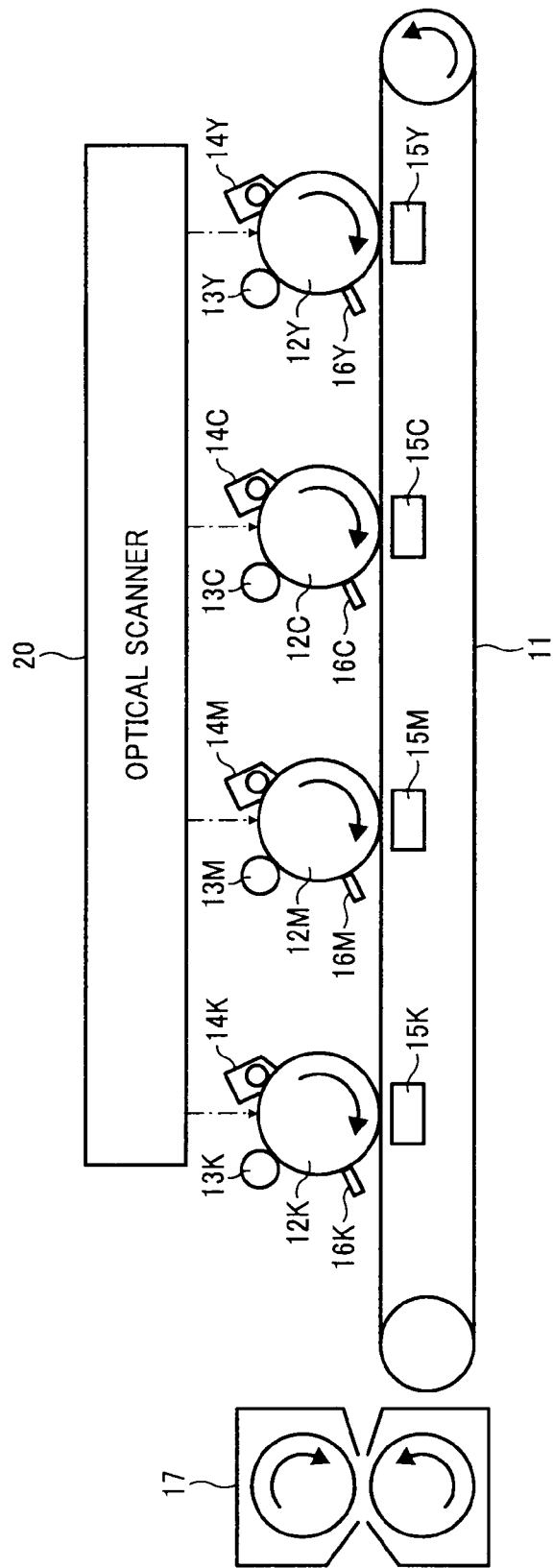
FIG. 15 is a schematic diagram for explaining the basic structure of a multicolor image forming apparatus (color image forming apparatus)

A tandem color image forming apparatus including the optical scanner 20 is explained below with reference to FIG. 15.

The color image forming apparatus includes the four photosensitive elements 12Y, 12C, 12M, and 12K that are arranged along a movement direction of a transfer belt 11. A charger 13Y, a developer 14Y, a transfer unit 15Y, and a cleaning unit 16Y are sequentially arranged around the photosensitive element 12Y for yellow image formation in a rotational direction that is indicated by an arrow. The other photosensitive elements 12C, 12M, and 12K, which include a similar structure, are differentiated using a reference symbol according to the respective color (C indicates cyan, M indicates magenta, and K indicates black) and an explanation is omitted.

The charger 13 is a charging member that forms a charging device for uniformly charging the photosensitive element surface. The optical scanner 20 emits the beam on the photosensitive element surface between the charger 13 and the developer 14 to form an electrostatic latent image on the photosensitive element 12.

Based on the electrostatic latent image, the developer 14 forms a toner image on the photosensitive element surface. The transfer unit 15 sequentially transfers the toner image of each color on a recording medium (transfer sheet) that is conveyed by the transfer belt 11. Finally, a fixing unit 17 fixes an overlapped image on the transfer sheet.

In the present embodiment, the intermediate member 30 supports the cylindrical lens 5 to obtain the desired sub-scanning beam pitch and also enables adjustment of the optical axis direction and adjustment around the optical axis. However, the cylindrical-lens supporting method with the intermediate member according to the present embodiment can also be applied to other optical elements such as a coupling lens or a scanning lens.

For example, if the coupling lens is supported in the similar manner to the cylindrical-lens supporting method with the intermediate member, it is possible to obtain the desired optical characteristics for each lens such as a beam spot diameter, a beam waist position etc. Furthermore, it is possible to provide the optical scanner that is durable and tolerant of temperature changes.

If an axis, which is orthogonal to a center of a surface B, is drawn in a direction that is parallel to both a surface A and the surface B, an asymmetry of linear expansion coefficients from the axis causes occurrence of a tilt of an optical element resulting from a deformation of an intermediate member due to temperature fluctuation.

According to an embodiment of the present invention, a fluctuation due to the asymmetry of the linear expansion coefficients is reduced and the tilt of the optical element is reduced. Thus, it is possible to provide an optical scanner that is tolerant of temperature changes and has preferable optical characteristics.

Moreover, respective positional relations are free and adjustable compared to a method that uses a screw cramp or plate spring fixing.

If the axis, which is orthogonal to the center of the surface B, is drawn in the direction that is parallel to both the surface A and the surface B, the asymmetry of the linear expansion coefficients from the axis causes occurrence of the tilt of the optical element due to a deformation of the intermediate member. Because the optical element is joined to the entire surface of the intermediate member, a joining surface becomes symmetrical with respect to the center of the intermediate member. Thus, the tilt of the optical element due to the deformation of the intermediate member can be minimized and the suitable optical characteristics can be obtained.

According to an embodiment of the present invention, after adjusting the optical element, the optical element can be fixed by hardening an adhesive agent at any timing, thus facilitating assembling.

Moreover, the intermediate member can be stabilized with respect to the housing and the tilt of the optical element can be suppressed.

If the axis, which is orthogonal to the center of the surface B, is drawn in the direction that is parallel to both the surface A and the surface B, the asymmetry of the linear expansion coefficients from the axis causes occurrence of the tilt of the optical element due to a deformation of the intermediate member.

According to an embodiment of the present invention, the linear expansion coefficients become symmetrical and the tilt of the optical element due to the deformation of the intermediate member can be minimized. Thus, it is possible to provide the optical scanner that is tolerant of temperature changes and has preferable optical characteristics.

If the axis, which is orthogonal to the center of the surface B, is drawn in the direction that is parallel to both the surface A and the surface B, the asymmetry of the linear expansion coefficients from the axis causes occurrence of the tilt of the optical element due to a deformation of the intermediate member.

According to an embodiment of the present invention, even if the temperature fluctuates, because the shape of the intermediate member is deformed symmetrically with respect to the center of the surface B, the tilt of the optical element due to the deformation of the intermediate member can be minimized. Thus, it is possible to provide the optical scanner that is tolerant of temperature changes and has preferable optical characteristics.

Moreover, the optical characteristics can be easily secured.

Furthermore, at least one of adjustable directions of the intermediate member with respect to the housing is different from at least one of adjustable directions of a cylindrical lens with respect to the intermediate member. Due to this, a plurality of the optical characteristics (for example, a beam waist diameter, a beam waist displacement reduction, and a beam spot displacement reduction) can be simultaneously secured. Moreover, decentering of the optical element around an axis parallel to an optical axis can be adjusted. Thus, it is possible to set the optical characteristics to optimum values.

Furthermore, the optical characteristics can be easily secured.

In a commonly used adjusting method of a sub-scanning beam pitch, a light source is rotated around an axis that is orthogonal to the main-scanning direction and the sub-scanning direction. However, in a beam splitting method in which beam splitting elements are used to split a beam from the common light source and the split beams scan different surfaces, although a desired pitch can be obtained for a photosensitive element, a pitch error occurs in the other photosensitive element due to a shape error or a fixing error of optical elements other than the beam splitting elements.

According to an embodiment of the present invention, the desired sub-scanning beam pitch can be obtained for the respective photosensitive element.

Moreover, it is possible to provide a high-quality image forming apparatus at a low cost.

Furthermore, it is possible to provide a high-quality color image forming apparatus at a low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:
a light source that emits a light beam;
a first optical system that guides the light beam;
a deflecting unit that receives the light beam from the first optical system and produces a deflected light beam by deflecting the light beam;
a second optical system that guides the deflected light beam onto a surface to be scanned;
a housing that supports the light source and the deflecting unit; and
an intermediate member that includes a first joining surface and a second joining surface, the first joining surface being substantially perpendicular to the second joining surface,
wherein the first joining surface is attached to the housing, and the second joining surface is attached to at least one optical element of any one of the first optical system and the second optical system, the second joining surface being attached to the at least one optical element at one end portion of the optical element, and
wherein, in a three-dimensional coordinate system in which a first coordinate axis extends in a direction that is parallel to both the first joining surface and the second joining surface, a second range on the first coordinate axis corresponding to the second joining surface includes a center point of a first range on the first coordinate axis corresponding to the first joining surface, and
wherein the first range is larger than the second range.

2. The optical scanner according to claim 1, wherein the first joining surface is fixed to the housing with an adhesive agent and the second joining surface is fixed to the optical element with the adhesive agent.

3. The optical scanner according to claim 2, wherein the first joining surface is attached to a bottom surface of the housing, and
wherein a shape of the second joining surface is substantially symmetric with respect to a line that is parallel to main-scanning direction and on which a center point of the second joining surface falls and a line that is parallel to sub-scanning direction and on which the center point of the second joining surface falls.

4. The optical scanner according to claim 2, wherein the intermediate member is transparent and the adhesive agent is an ultraviolet curable resin.

5. The optical scanner according to claim 1, wherein the second range is positioned near a center area of the first range.

6. The optical scanner according to claim 1, wherein a shape of the intermediate member is substantially symmetrical with respect to a plane that is orthogonal to the first joining surface and the second joining surface and on which the center point of the first joining surface is located.

7. The optical scanner according to claim 1, wherein a position of the intermediate member is adjustable in the housing, and
wherein a position of the at least one optical element is adjustable in two or more directions with respect to the intermediate member.

8. The optical scanner according to claim 7, wherein the position of the intermediate member is adjustable in two or more directions with respect to the housing.

9. The optical scanner according to claim 8, wherein at least one of the directions in which the position of the intermediate member is adjustable with respect to the housing is different from at least one of the directions in which the position of the at least one optical element is adjustable with respect to the intermediate member.

10. The optical scanner according to claim 1, further comprising a beam splitting unit that receives the light beam from the light source and splits the light beam into a plurality of split beams,
wherein the second optical system guides each of the split beams onto a different surface to be scanned.

11. The optical scanner according to claim 1, wherein the second joining surface extends entirely across a width of a supporting portion of the intermediate member.

12. An image forming apparatus comprising:
an optical scanner that includes
a light source that emits a light beam;
a first optical system that guides the light beam;
a deflecting unit that receives the light beam from the first optical system and produces a deflected light beam by deflecting the light beam;
a second optical system that guides the deflected light beam onto a surface to be scanned;
a housing that supports the light source and the deflecting unit; and
an intermediate member that includes a first joining surface and a second joining surface, the first joining surface being substantially perpendicular to the second joining surface,
wherein the intermediate member is attached to the housing via the first joining surface, and at least one optical element of any one of the first optical system and the second optical system is attached to the intermediate member via the second joining surface,
wherein, in a three-dimensional coordinate system in which a first coordinate extends in a direction that is parallel to both the first joining surface and the second joining surface, a second range on the first coordinate axis corresponding to the second joining surface includes a center point of a first range on the first coordinate axis corresponding to the first joining surface, and
wherein the first range is larger than the second range.

13. The image forming apparatus according to claim 12, wherein the image forming apparatus is a color image forming apparatus.

14. The image forming apparatus according to claim 12, wherein the second joining surface extends entirely across a width of a supporting portion of the intermediate member.

* * * * *